United States Patent [19]

Harris

[11] Patent Number: 4,824,134

[45] Date of Patent: Apr. 25, 1989

[54] PORTABLE FIFTH WHEEL HITCH APPARATUS

[76] Inventor: George M. Harris, Rte. 14, Box 3010A, Kennewick, Wash. 99337

[21] Appl. No.: 169,694

[22] Filed: Mar. 18, 1988

[51] Int. Cl.[4] .......................... B60D 1/00; B60D 53/06
[52] U.S. Cl. .................................. 280/438.1; 280/495; 280/423.1; 280/901
[58] Field of Search ........... 280/423 R, 415 R, 415 B, 280/433, 438 R, 438 A, 460 R, 491 R, 491 E, 495, 496, 504; 296/43, 37.6

[56] References Cited

U.S. PATENT DOCUMENTS

| | | | |
|---|---|---|---|
| 3,164,398 | 1/1965 | Lugash | 280/423 R |
| 3,164,399 | 1/1965 | Lugash | 280/423 R |
| 3,390,896 | 7/1968 | Philapy | 280/423 R |
| 3,392,992 | 7/1968 | Baker | 280/423 R |
| 3,421,726 | 1/1969 | Getter | 296/43 |
| 3,811,706 | 5/1974 | Tucker | 280/423 R |
| 3,874,702 | 4/1975 | Hall | 280/423 R |
| 3,887,220 | 6/1975 | Hall | 280/423 R |
| 3,893,713 | 7/1975 | Ivy | 280/511 |
| 3,936,077 | 2/1976 | Bliek | 280/423 R |
| 4,088,339 | 5/1978 | Sagebiel | 280/423 R |
| 4,327,934 | 5/1982 | Karnes | 280/423 R |
| 4,411,444 | 10/1983 | Holloway | 280/423 R |
| 4,643,443 | 2/1987 | Husa | 280/491 R |
| 4,657,299 | 4/1987 | Mahan | 296/43 |

Primary Examiner—Charles A. Marmor
Assistant Examiner—Everett G. Diederiks, Jr.
Attorney, Agent, or Firm—Henderson & Sturm

[57] ABSTRACT

A portable fifth wheel hitch assembly (10) for conventional pick-up trucks (100); wherein, the assembly (10) comprises a plurality of rail units (11) which are removably secured to the truck side walls (105) via a plurality of expansible securing members (60) that fit inside the stake wells (103) of the truck (100); and wherein the assembly further comprises a draw bar unit (12) having pintles (72) whereby the draw bar unit (12) having pintles (72) whereby the draw bar unit (12) is operatively and removably connected to the rail units (11) via a pintle capturing assembly (50).

6 Claims, 2 Drawing Sheets

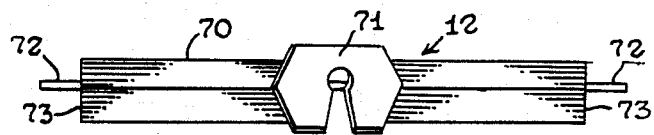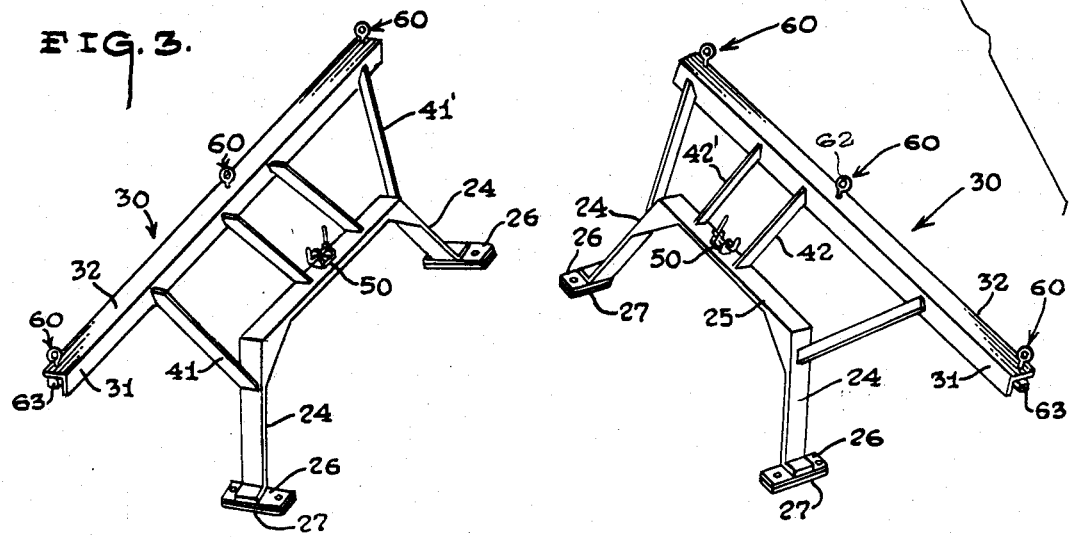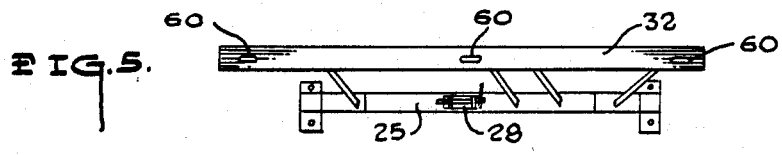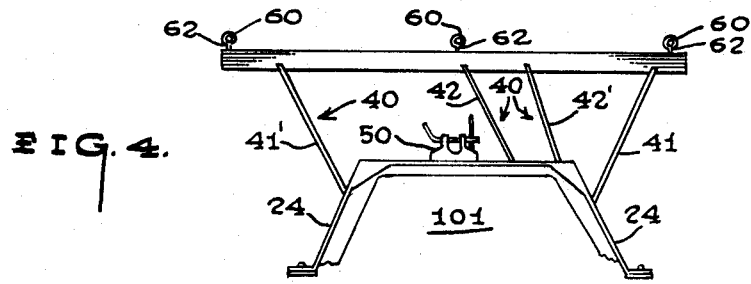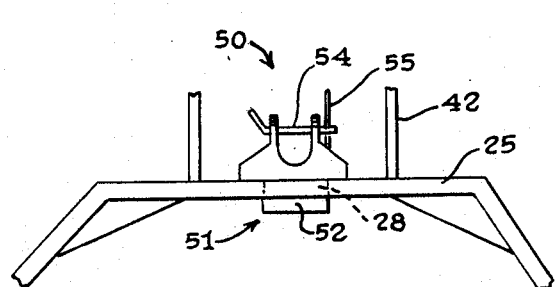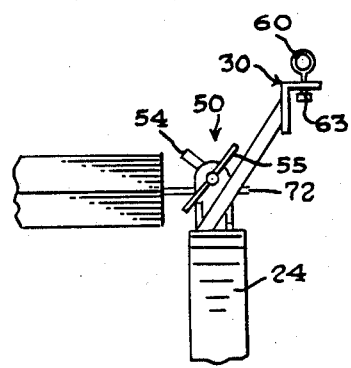

PORTABLE FIFTH WHEEL HITCH APPARATUS

TECHNICAL FIELD

The present invention relates generally to the field of fifth wheel hitch apparatus and more specifically to removable trailer hitch assemblies for pick up trucks.

BACKGROUND OF THE INVENTION

As can be seen by reference to the following U.S. Pat. Nos. 4,088,339; 3,874,702; 3,887,220; and, 3,893,713 the prior art is replete with myriad and diverse trailer hitch constructions developed to facilitate the hitching of a trailer to either a car or a truck.

While the aforementioned prior art constructions are more than adequate for their intended purpose and function; they also are impractical from the standpoint that virtually all of these constructions require some form of permanent structural modification of the vehicle body or bed in order to accommodate the hitch device.

In the most drastic examples, the structural modifications are so extensive as to virtually require factory installation of the required hardware in order to make the modifications economically feasible for the average consumer.

In other instances wherein the structural modifications are not unduly extensive these devices still require semi-permanent installation of structural components that at a minimum involve the penetration of the vehicle body to effect the operative connection between the hitch assembly and the vehicle.

Obviously there has existed a long felt need for a fifth wheel trailer hitch assembly that can quickly and easily be both installed and removed from the bed of a pick-up truck; wherein, the hitch assembly would utilize the existing pick-up body construction to effect the releasable securement of the trailer hitch components; and, wherein, portions of the trailer hitch assembly could remain within the pick-up truck bed when not in use without materially altering the load carrying capacity of the truck bed.

SUMMARY OF THE INVENTION

The portable fifth wheel hitch assembly that forms the basis of the present invention comprises in general: a pair of rail units; and, an elongated draw box unit that includes a hitch member; wherein, the rail units are provided with releasable securing means that cooperate with the pre-existing stake wells in the truck sidewalls to releasably secure the rail units over the wheel wells and alongside the truck bed side walls.

In addition, the rail units are further provided with pin members that are adapted to cooperate with the outboard ends of the elongated draw bar unit; whereby, the draw bar unit may be operatively coupled and decoupled from the rail units and the truck bed.

As will be explained in greater detail further on in the specification, the rail units of this invention are specifically designed to take advantage of existing structural features found in conventional pick-up bodies (i.e. stake wells) to transfer the draw weight of the trailed load directly to the pick-up truck body without requiring any structural modification to the truck body per se.

In addition, this arrangement allows the hitch assembly to be quickly installed and removed from the truck bed when desired; or, in the alternative the rail units may be left in their installed mode even when not in use, since the rail units do not excessively intrude or occupy significant portions of the load carrying capacity of the truck bed.

BRIEF DESCRIPTION OF THE DRAWINGS

These and other objects, advantages, and novel features of the invention will become apparent from the detailed description of the best mode for carrying out the preferred embodiment of the invention which follows; particularly when considered in conjunction with the accompanying drawings, wherein:

FIG. 3 is an exploded perspective view of the hitch assembly;

FIG. 4 is a side plan view of one of the rail units;

FIG. 5 is a top plan view of one of the rail units;

FIG. 6 is an enlarged detail side view of the securing means connecting the rail units to the truck body; and, FIG. 7 is an enlarged detail front view of the operative connection between the rail units and the hitch draw bar.

BEST MODE FOR CARRYING OUT THE INVENTION

Figure 1:
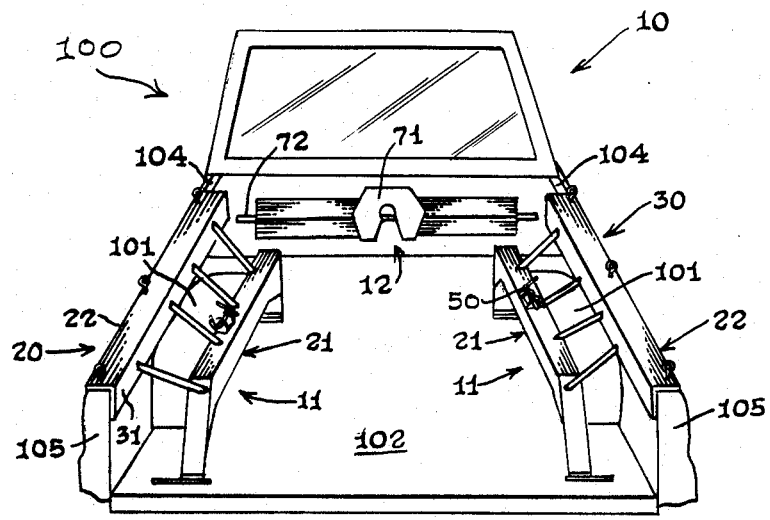
FIG. 1 is a perspective view of the trailer hitch assembly of this invention disposed in a conventional pick-up truck.

As can be seen by reference to the drawings and in particular to FIG. 1, the portable fifth wheel hitch assembly that forms the basis of the present invention is designated generally by the reference numeral (10). The assembly (10) comprises in general: a pair of rail units (11) and a draw bar unit (12) which are adapted to cooperate with a conventional pick-up truck construction which is designated generally by reference numeral (100). These units will now be described in seriatim fashion.

As can best be seen by reference to FIGS. 3 thru 5, each of the rail units (11) comprise a rail member (20) having a generally inverted U-shaped lower element (21) an elongated horizontally disposed upper element (22) and a plurality of brace elements which dispose the upper element (22) in a vertically off-set relationship with respect to the lower element (21).

The generally inverted U-shaped lower element (21) of the rail member (20) comprises a pair of angled rigid leg members (24) joined together on their upper ends by an elongated horizontally disposed yoke member (25). Each of the leg members (24) is further provided with enlarged horizontally disposed foot plates (26) having a foot pad element (27) fabricated from a high coefficient of friction material, such as rubber, or the like; wherein, the foot pad element (27) is secured such as by adhesives to the bottom of each foot plate (26). In addition, the yoke member (25) is provided with an enlarged generally rectangular aperture (28) disposed proximate its midpoint; wherein, the aperture (28) is dimensioned to releasably receive a pintle capturing means (50), which will be described in greater detail further on in the specification.

As can best be appreciated by reference to FIGS. 1 and 4, the lower element (21) of each of the rail members (20) is dimensioned to overlie each of the standard wheel well housings (101) formed on opposite sides of the bed (102) of a typical pick-up truck construction (100). Prior to embarking on a further description of the rail units (11), it should be further noted that the other standard structural components of a typical pick-up truck construction (100), which the assembly (10) is designed to cooperate with, involves the plurality of stake wells (103) which are formed along the top surface (104) of the side walls (105) of the pick-up truck (100).

Figure 2:
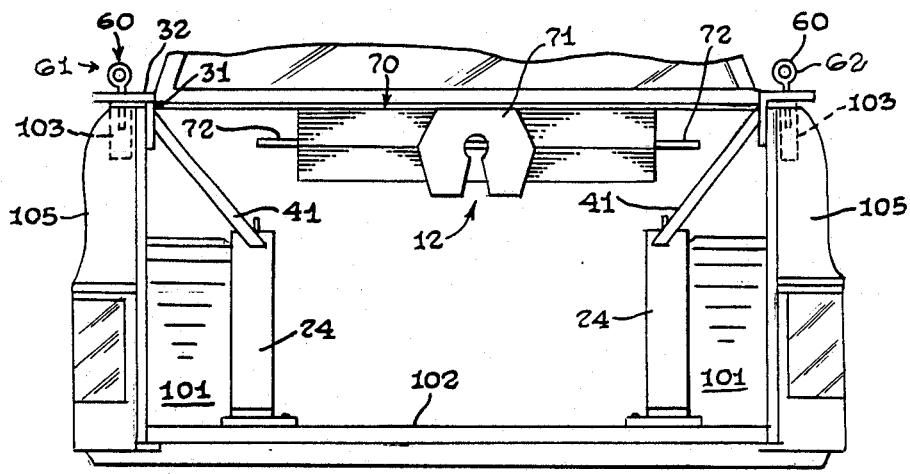
FIG. 2 is an end view of the hitch assembly in its operative disposition.

As shown in FIGS. 1 thru 3, the upper element (22) of each of the rail members (20) comprise an elongated inverted L-shaped bracket member (30) having a vertical (31) and horizontal (32) bracket leg; wherein, the bracket member (30) is dimensioned to extend along, and generally conform to, the interior and top surface (104) of the side walls (105) of the pick-up truck (100).

As can also be appreciated by reference to the drawings, the plurality of brace elements (23) that operatively connect the upper element (22) to the lower element (21) of the rail member (20) comprise a plurality of angled brace arms (40) wherein at least one of the brace arms (41) is operatively attached on its lower end to one of the legs (24) of the lower rail elements (21); and at least one other brace arm (42) is operatively attached on its lower end to the yoke member (25) of the lower rail element (21); and wherein both of the brace arms (41) and (42) are operatively attached on their upper ends to vertical bracket leg (31) of the upper rail element (22).

It should also be noted that in the preferred embodiment of this invention, which is illustrated in the drawings, the rail unit (11) is provided with a pair of brace arms (41)(41 ') which extend between the upper rail element (22) and each of the legs (24) of the lower rail element; as well as, a pair of brace arms (42)(42 ') which extend between the upper rail element (22) and the yoke member (25) of the lower rail element (21).

Turning now to FIGS. 2 thru 5, it can be seen that the horizontal bracket leg (32) of each of the upper rail elements (22) is provided with a plurality of spaced securing means (60); wherein, the spacing between the plurality of securing means (60) coincides with the spacing between the plurality of spaced stake wells (103) in the side walls of a typical pick-up truck construction (100).

As can best be seen by reference to FIGS. 2 and 7, each of the securing means (60) comprises an expansible securing member (61), which has an upper actuating element (62), that is operatively attached to a lower expansion element (63); wherein, the lower expansion element (63) in an uncomprised state, is dimensioned to be received within a complementary stake well (103) in one of the sidewalls (105) of the truck (100). Once the securing members (61) have been inserted into the respective stake wells (103) of the truck (100), the actuating elements (62) are deployed to contract and expand the expansion elements (63) in a well recognized fashion to fixedly yet releasably secure the rail units (11) to the truck (100).

Once the rail units (11) have been installed in the truck (100) the draw bar unit (12) may be operatively connected to the rail units (11) via the pintle capturing means (50) as will be explained shortly. Referring to FIGS. 1 thru 3, it can be seen that the draw bar unit (12) comprises a draw bar member (70) having a centrally disposed locking hitch box (71) and a pair of pintle pins (72) projecting from the opposite ends (73) of the draw bar member (70).

As best depicted in FIGS. 6 and 7, the pintle capture means (50) comprises a capture member (51) having a lower portion (52) which is adapted to be releasably engaged in the enlarged aperture (28) in the yoke member (25) of each of the rail units (11), and an upper generally U-shaped portion (53) which is dimensioned to receive one of the pintle pins (72) on opposite ends of the draw bar member (70); a locking bar element (54) that is slideably received in suitable apertures formed in the upper portion (53); and, a securing bar (55) which captures the locking bar element (54) relative to the U-shaped upper portion (53).

At this juncture it should be apparent that the rail units (11) of the apparatus (10) comprise rigid structural elements, which are preferably fabricated from hardened metal, in order to withstand the draft weight that is exerted on the apparatus (10) and the truck (100) by virtue of the drawn trailer (not shown). It should also be appreciated the apparatus (10) of the present invention does not require any permanent modification and/or attachment to the conventional truck body (100); and, that the close conformity of the rail units (11) relative to the close conformity of the rail units (11) relative to the wheel well housing (110) and the side walls (105) of the truck (100) occupy a minimum amount of the available cargo space within the truck bed (102), when the draw bar unit (12) has been removed from operative engagement with the rail units (11).

Having thereby described the subject matter of this invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A portable fifth wheel hitch assembly in combination with a conventional pick-up truck construction having a truck bed, raised wheel well housing, and sidewalls having a top surface provided with a plurality of spaced stake wells; wherein, the assembly comprises:

a draw bar unit comprising a draw bar member having a centrally disposed hitch box and a pair of pintle pins projecting from opposite ends of the draw bar member; and, a pair of rail units; wherein, each of the rail units comprises a rail member having: a generally U-shaped lower element adapted to overlie the opposed wheel well housings; an elongated horizontally disposed upper element; and, a plurality of brace elements extending between said upper and lower elements; wherein, the upper element of each rail member is provided with a plurality of securing means that are spaced and dimensioned to be received within the plurality of stake wells in the side walls of the truck to form the operative connection between the truck and the rail units; and, wherein the lower element of each rail member is provided with a pintle capturing means for operatively connecting the draw bar unit to the conventional pick-up truck construction.

2. The assembly as in claim 1; wherein, said plurality of securing means comprise expansible securing members having an upper actuating element that is operatively connected to a lower compressible expansion element.

3. The assembly as in claim 1; wherein, the lower element of the rail member comprises a pair of angled leg members joined together on their upper ends by an elongated horizontally disposed yoke member.

4. The assembly as in claim 3; wherein, said horizontally disposed yoke member is provided with an enlarged aperture disposed proximate its midpoint; wherein, the enlarge aperture is dimensioned to releasably receive said pintle capturing means.

5. The assembly as in claim 4; wherein, each of the legs of said lower element are provided with horizontally disposed foot plates.

6. The assembly as in claim 5; wherein, each foot plate is provided with a foot pad element fabricated from a high coefficient of friction material.

* * * * *